US012796657B2

(12) United States Patent
Sousa

(10) Patent No.: US 12,796,657 B2
(45) Date of Patent: Nov. 17, 2026

(54) BunBun NAIL BASKET

(71) Applicant: Sarah Lynn Sousa, Augusta, ME (US)

(72) Inventor: Sarah Lynn Sousa, Augusta, ME (US)

( * ) Notice: Subject to any disclaimer, the term of this patent is extended or adjusted under 35 U.S.C. 154(b) by 0 days.

(21) Appl. No.: 18/445,650

(22) Filed: Dec. 11, 2023

(65) Prior Publication Data

US 2025/0311699 A1 Oct. 9, 2025

(51) Int. Cl.
*A01K 13/00* (2006.01)

(52) U.S. Cl.
CPC .................................. *A01K 13/007* (2013.01)

(58) Field of Classification Search
CPC ............................ A01K 13/006; A01K 13/007
See application file for complete search history.

(56) References Cited

U.S. PATENT DOCUMENTS

| | | | | | |
|---|---|---|---|---|---|
| 2,424,172 | A * | 7/1947 | Huddleston | A01K 13/007 | 54/82 |
| 4,796,567 | A * | 1/1989 | Allan | A01K 13/006 | 119/678 |
| 10,791,709 | B1 * | 10/2020 | Lawson | A01K 13/006 | |
| 2010/0180831 | A1 * | 7/2010 | Fleming | A01K 13/001 | 119/651 |
| 2014/0026915 | A1 * | 1/2014 | Darjania | A45D 29/00 | 132/73 |
| 2024/0188538 | A1 * | 6/2024 | Perella | A01K 13/007 | |
| 2025/0169470 | A1 * | 5/2025 | Oh | A01K 13/007 | |

* cited by examiner

*Primary Examiner* — Michael H Wang

(57) ABSTRACT

The BunBun Nail Basket is a pet grooming aid comprised of a cylindrical shaped cuff of varying natural and man made materials, natural pet safe edible materials that is open on one end, has netting attached on the other end, and is alternatively comprised of an open-ended cuff base, that is threaded at one end in the same manner as the mouth of a mason jar, and a detachable threaded lid with inserted netting.

1 Claim, 4 Drawing Sheets

Fig 4
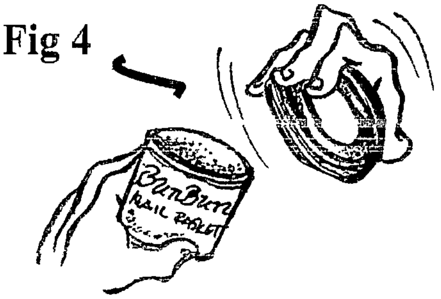
Fig 5
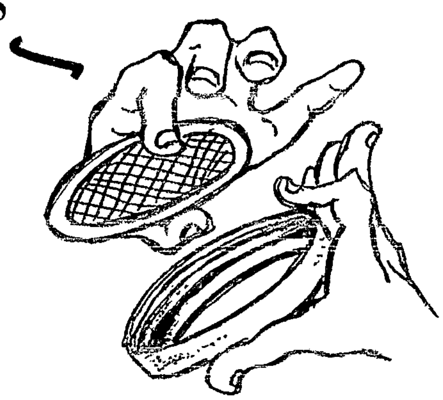
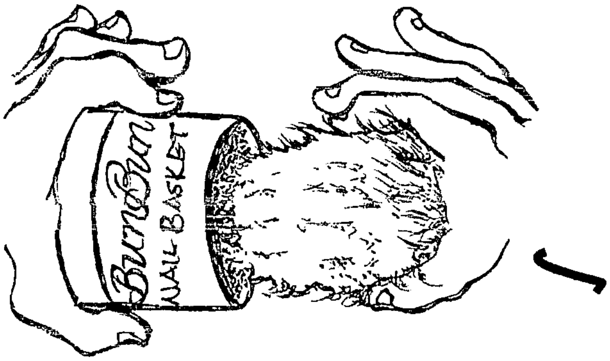
Fig 6
Fig 7
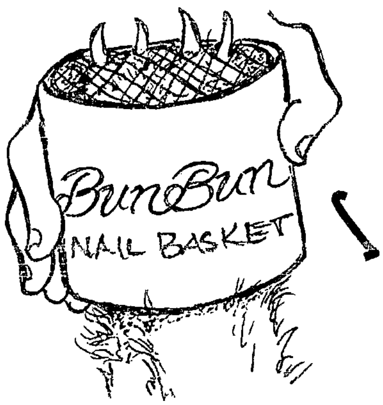
Fig 8

BunBun NAIL BASKET

FIELD

The BunBun Nail Basket is a nail trimming grooming aid for pets.

BACKGROUND

Many people fail to trim their pet's nails due to the oftentimes stressful nature of the task, the difficulty in working around the animal's paw hair, and possible anxiety issues of the pet, which can sometimes result in injury to either nail trimming participant, causing further anxiety and pet behavioral issues in future grooming situations.

SUMMARY

The BunBun Nail Basket is placed over the top of the pet animal's paw and pushes the paw fur down and away from the nails of the paw, which presents the nail clearly for a much more safe nail trimming experience that alleviates anxiety and behavioral issues of both grooming participants.

BRIEF DESCRIPTION OF THE DRAWINGS

FIG. 4 shows the lid being removed from the base of the nail basket.

FIG. 5 shows the netting being inserted into the lid of the nail basket.

FIG. 6 shows the a user holding pet animal's pet and the nail basket.

Fig. 7 shows the nail basket being placed over the pet animal's paw.

Fig. 8 shows the nail basket being pushed down over the paw until the nail basket is secured against the end of the paw and the nails are exposed for trimming.

DETAILED DESCRIPTION OF THE INVENTION

Figure 1:
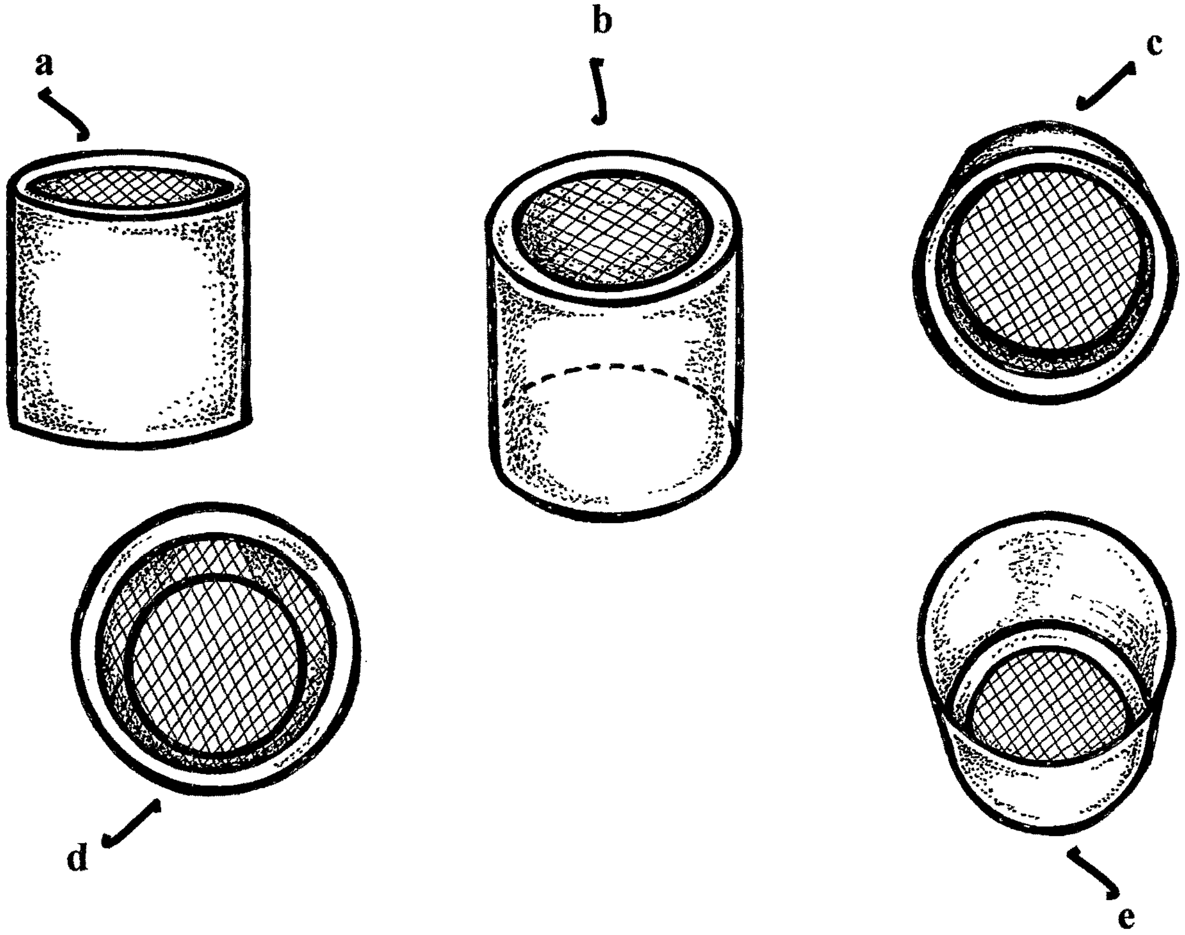
FIGS. 1*a-e* are various views showing a nail basket according to a first embodiment of the present disclosure.

FIGS. 1*a*-1*e* show an embodiment of the present invention with permanent netting. This embodiment can be made of hard plastic, polyurethane, or epoxy resin. Alternatively, this embodiment can a solid unit made of doubled, reinforced cotton, hemp, or other natural fabrics, or synthetic poly canvas that is washable, fold-able, non-toxic, and travel friendly. Further alternatively, this embodiment can be made with cardboard that is around 2-3cm thick with a strong, natural fibrous twine used to make the top netting.

Figure 2:
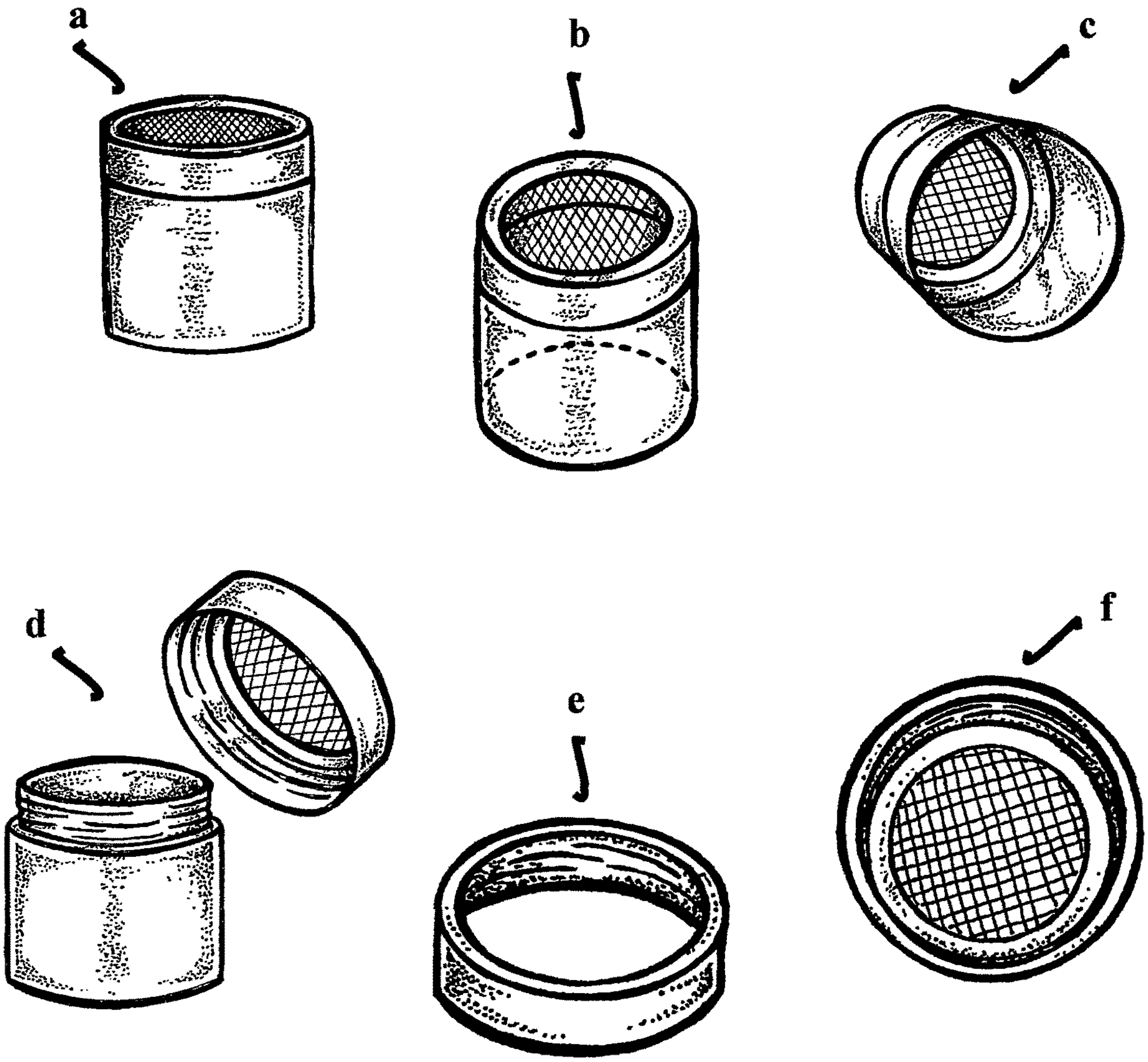
FIGS. 2*a*-2*c* are various views showing a nail basket with a removable lid and disposable netting according to a second embodiment of the present disclosure.
FIG. 2d shows the nail basket of the second embodiment with the lid removed from the base of the nail basket.
FIG. 2e shows the lid of the second embodiment with the disposable netting removed.
FIG. 2f shows the lid of the second embodiment with the disposable netting inserted.

Figure 2*a*-2*f* show an embodiment of the present invention with a stainless steel base, a lid, and a disposable netting disk for personal, veterinarian, grooming or shelter environments for easy sterilization. The disposable netting disk comprises an outer support ring that can be made of cardboard, natural plant materials, or similar disposable, compost-able material. The netting of the disposable netting disk can be made of nylon, cotton, hemp, or any natural, preferably biodegradable, material that can be made into a fishnet-type weave for the purpose of placing over ends of pet's paws to reveal the nails away from excess fur.

Figure 3:
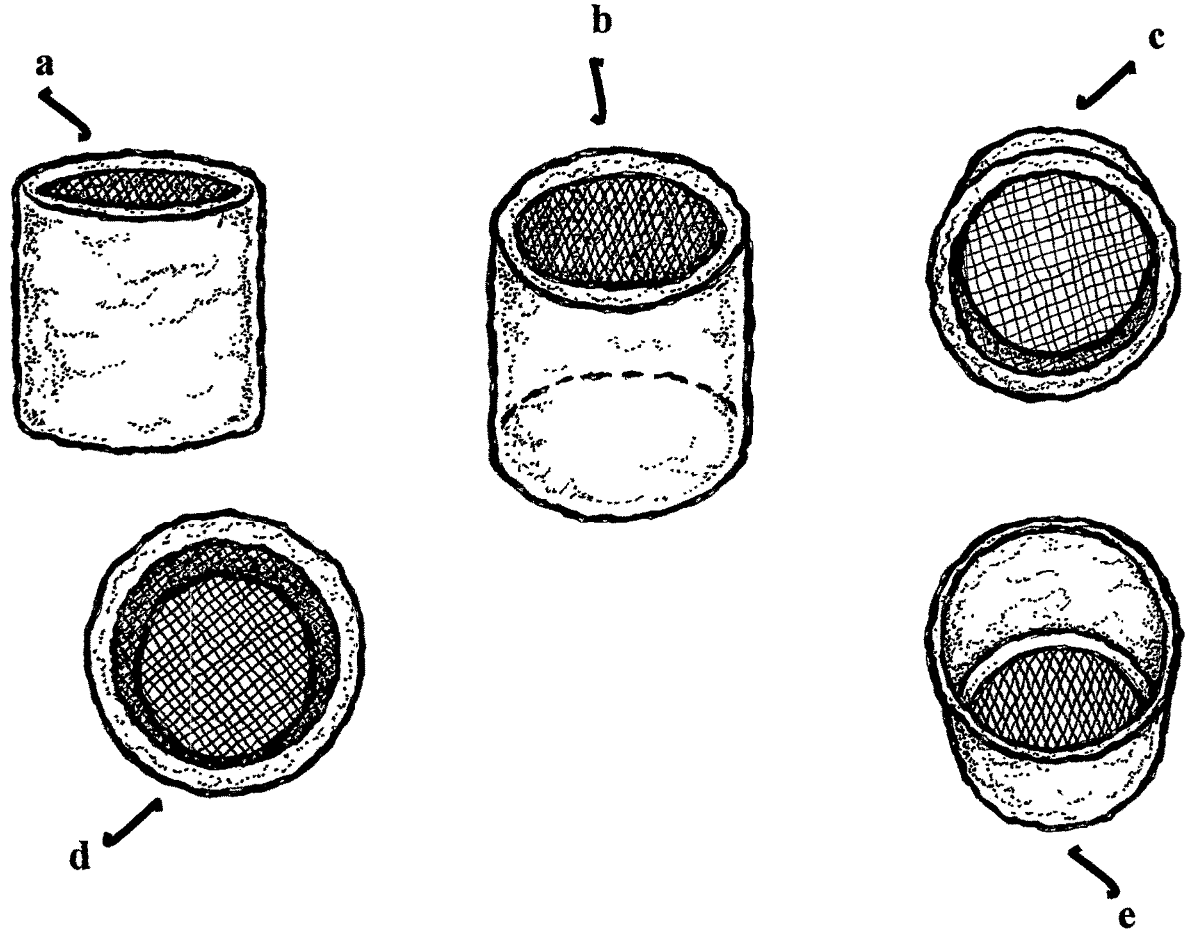
FIGS. 3*a*-3*e* are various views showing a nail basket according to an edible third embodiment of the present disclosure.

All disposable units of the BunBun Nail Basket should be made of natural or actual compost-able/biodegradable materials that begin to break down following disposal, regardless of disposal technique or location, i.e., landfills, which often prevent bio-plastics from being exposed to elements which aid in decomposition. Water solubility and non-toxicity must play a factor. Examples of such materials include:

- Environmentally sound sugarcane bi-product (Bagasse)·
- Hemp and/or any similar applicable plant-based sources
- Non-petrochemical biodegradable bio-based plastic-type materials including, but not limited to:
  - Polyhydroxyalkanoates (PHAs)
  - Polylactic acid (PLA)
  - Thermoplastic polymer starch blends that are proven biodegradable
  - Cellulose-based plastics
  - Lignin-based polymer composites
  - Polyglycolic acid (PGA)
  - Polybutylene succinate (PBS)
  - Polycaprolactone (PCL)
  - Poly vinyl alcohol (PVA, PVOH)
  - Polybutylene adipate terephthalate
- Stainless steel base and lid for personal, veterinarian, pet salon or shelter environments for easy sterilization FIG. 3*a-e* show an embodiment of the present invention made from compressed Timothy Hay, other similar prairie grass or rodent/rabbit safe, herbivore-edible fibrous plant with added ingredients such as potato starch for solidity and honey for flavor. This embodiment can be a one-time use treat for good nail trimming experience and a reward training tool for elimination of anxiety and fear during nail clipping.

FIGS. 4-8 show the steps of using the embodiment of FIGS. 2*a-f*. Fig. 4 shows the lid being removed from the base of the nail basket. Fig. 5 shows the netting being inserted into the lid of the nail basket. Fig. 6 shows the a user holding pet animal's pet and the nail basket. Fig. 7 shows the nail basket being placed over the pet animal's paw. Fig. 8 shows the nail basket being pushed down over the paw until the nail basket is secured against the end of the paw and the nails are exposed for trimming.

Edible Model

FIG. 3:

Made from compressed Timothy Hay, other similar prairie grass or rodent/rabbit safe herbivore-edible fibrous plant with added ingredients such as potato starch for solidity and honey for flavor—can be a one-time use treat for good nail trimming experience and reward training tool for elimination of anxiety and fear during nail clipping.

DESCRIPTION

New Material

FIG. 1 & FIG. 3 a is a side perspective view b is a tilted top inner view c is a bottom inner view d is a top view e is a tilted bottom inner view Dotted lines are indicative of the unseen side of the cylindrical design.

FIG. 2 a is a side perspective view b is a tilted top inner view c is a bottom inner view d is a side view with the removable lid detached e is a tilted top inner view of the lid absent the netting f is a bottom inner view of the lid with the netting Dotted lines are indicative of the unseen side of the cylindrical design.

The invention claimed is:

1. An open-ended cylindrical cuff comprising:

a. a rigid, cylindrical base having a first end and an opposing second end, wherein the base is open at both ends, wherein the first end is machine-threaded;

b. a rigid, open-ended, machine-threaded lid;

c. an insertable netting, wherein when the netting is inserted into the lid and the lid is threadably attached to the base, the netting is retained between the base and the lid;

d. wherein when an animal's paw is inserted into the second end of the base, paw hair is retained by the netting and the nails of the paw extend through the netting and the lid.

* * * * *